(12) United States Patent
Vithana

(10) Patent No.: US 8,724,059 B2
(45) Date of Patent: May 13, 2014

(54) VERTICALLY ALIGNED NEMATIC MODE LIQUID CRYSTAL DISPLAY HAVING LARGE TILT ANGLES AND HIGH CONTRAST

(75) Inventor: Hemasiri Vithana, Chandler, AZ (US)

(73) Assignee: Compound Photonics Limited, London (GB)

( * ) Notice: Subject to any disclaimer, the term of this patent is extended or adjusted under 35 U.S.C. 154(b) by 850 days.

(21) Appl. No.: 12/561,351

(22) Filed: Sep. 17, 2009

(65) Prior Publication Data

US 2010/0207931 A1    Aug. 19, 2010

Related U.S. Application Data

(63) Continuation of application No. 11/225,683, filed on Sep. 13, 2005, now abandoned, which is a continuation of application No. 10/438,511, filed on May 15, 2003, now abandoned.

(60) Provisional application No. 60/450,370, filed on Feb. 26, 2003.

(51) Int. Cl.
*G02F 1/1335* (2006.01)

(52) U.S. Cl.
USPC .......................................................... 349/113

(58) Field of Classification Search
USPC .................. 349/115, 113, 141, 127–128, 114
See application file for complete search history.

(56) References Cited

U.S. PATENT DOCUMENTS

| | | | |
|---|---|---|---|
| 5,621,558 | A | 4/1997 | Shimada et al. |
| 6,108,064 | A | 8/2000 | Minoura et al. |
| 6,141,074 | A | 10/2000 | Bos et al. |
| 6,426,786 | B1 | 7/2002 | Lu et al. |

(Continued)

FOREIGN PATENT DOCUMENTS

| | | |
|---|---|---|
| CH | 661361 | 7/1987 |
| EP | 0793133 | 9/1997 |

(Continued)

OTHER PUBLICATIONS

International PCT Search Report and the Written Opinion of the International Searching Authority, or the Declaration, PCT/US2004/005797, 15 pages.

(Continued)

*Primary Examiner* — James Dudek
(74) *Attorney, Agent, or Firm* — McKenna Long & Aldridge LLP

(57) ABSTRACT

A reflective liquid crystal on silicon (LCOS) display comprises a transparent substrate, a reflective substrate, and liquid crystal fluid between the substrates. The LCOS display further comprises a matrix of pixels, arranged in a plurality of rows and columns, wherein an intersection of a row and a column defines a position of a pixel in the matrix. The LCOS display has tilt angles sufficient to overcome disclinations due to fringe fields, and, at the same time, achieves high contrast. The surface azimuthal direction of the molecules of the liquid crystal fluid is either substantially parallel or perpendicular to the direction of polarization of incoming incident linearly polarized light. Light leakage is minimal because the effective birefringence as seen by the incoming incident linearly polarized light is substantially zero and does not depend on the pretilt of the molecules of the liquid crystal fluid. Between the transparent substrate and the reflective substrate, the twist of the molecules of the liquid crystal fluid may vary from about 0 degrees to about 90 degrees when in the "OFF" state.

21 Claims, 5 Drawing Sheets

(56) References Cited

U.S. PATENT DOCUMENTS

| | | |
|---|---|---|
| 6,556,267 B2 | 4/2003 | Koma |
| 2001/0030723 A1 | 10/2001 | Koma |
| 2002/0047965 A1 | 4/2002 | Suzuki et al. |
| 2002/0063826 A1 | 5/2002 | Okamoto et al. |
| 2004/0032551 A1 | 2/2004 | Hashimoto et al. |
| 2004/0233356 A1 | 11/2004 | Suzuki et al. |

FOREIGN PATENT DOCUMENTS

| | | |
|---|---|---|
| JP | 03-243919 | 10/1991 |
| JP | 8-43825 | 2/1996 |
| JP | 06175519 | 2/1996 |
| JP | 10-123576 | 5/1998 |
| JP | 11-143402 | 5/1999 |
| JP | 13-343652 | 12/2001 |
| JP | 2002-72217 | 3/2002 |
| WO | 96/10774 | 4/1996 |

OTHER PUBLICATIONS

Takahasi, Tauu, et al., "Electrooptical Properties of Vertically Aligned Twisted Nematic Cells with Negative Dielectric Anisotropy," Jpn. J. Appl. Phys. vol. 36, pp. 3531-3536.

Wu, Shin-Tson, et al., (Hughes Research Laboratories, Malibu, CA), "Mixed-Mode Twisted Nematic Liquid Crystal Cells for Reflective Displays," 1996 American Institute of Physics [S0003-6951(96)03611-X], pp. 1455-1457.

Yu, F.H., et al., (Department of Electrical and Electronic Engineering, The Hong Kong University of Science & Technology, Clear Water Bay, Kowloon, Hong Kong), "A New TN-ECB Mode Reflective Liquid Crystal Display With Large Cell Gap and Low Operating Voltage".

Vithana, Hemasiri, et al., "Nearly Hemotrophically Aligned Four-Domain Liquid Crystal Display With Wide Viewing Angle," Jpn. J. Appl. Phys. vol. 35 (1996), pp. 2222-2227.

"OFF" state VAN mode

"ON" state VAN mode

VERTICALLY ALIGNED NEMATIC MODE LIQUID CRYSTAL DISPLAY HAVING LARGE TILT ANGLES AND HIGH CONTRAST

RELATED APPLICATION

This application is a continuation of U.S. patent application Ser. No. 11/225,683, filed Sep. 13, 2005 (now abandoned), which is a continuation of U.S. patent application Ser. No. 10/438,511, filed May 15, 2003 (now abandoned), which claims priority to U.S. Provisional Patent Application No. 60/450,370, filed Feb. 26, 2003, and is incorporated herein by reference for all purposes.

FIELD OF THE INVENTION

The present invention relates generally to liquid crystal displays (LCDs), and more particularly to reflective liquid crystal on silicon (LCOS) displays.

BACKGROUND OF THE FIELD OF TECHNOLOGY

Liquid crystal display technology has reduced the size of displays from full screen sizes to minidisplays of less than 1.3 inches diagonal measurement, to microdisplays that require a magnification system. Microdisplays may be manufactured using semiconductor integrated circuit (IC) dynamic random access memory (DRAM) process technologies, e.g., liquid crystal on silicon (LCOS). The LCOS microdisplays consist of a silicon substrate backplane with a reflective surface, a cover glass and an intervening liquid crystal layer. The LCOS microdisplays are arranged as a matrix of pixels arranged in a plurality of rows and columns, wherein an intersection of a row and a column defines a position of a pixel in the matrix. To incident light, each pixel is a liquid crystal cell above a reflecting mirror. By changing the molecular orientation of the liquid crystal in the layer, characterized by a tilt angle and a twist angle of the liquid crystal director at any point in the layer, the incident light can be made to change its polarization. The silicon backplane is an array of pixels, typically 7 to 20 micrometers ($\mu$m) in pitch. Each pixel has a mirrored surface that occupies most of the pixel area. The mirrored surface is also an electrical conductor that forms a pixel capacitor with the liquid crystal display cover glass electrode which is a transparent conductive coating on the inside face (liquid crystal side) of the cover glass. This transparent conductive coating is typically Indium Tin Oxide (ITO). As each pixel capacitor is charged to a certain voltage value, the liquid crystal fluid between the plates of the pixel capacitors changes its molecular orientation which affects the polarization state of the light incident to the pixels (reflections from the pixel mirrors).

The reflective LCOS microdisplays have a high aperture ratio, and therefore can provide greater brightness than transmissive liquid crystal displays. Major applications of these LCOS microdisplays are in home theater applications, e.g., projectors, and front and rear projection televisions (large screen). For these applications, high contrast is very important. High contrast depends upon the liquid crystal optical mode being used in the liquid crystal display. Typically, a Vertically Aligned Nematic (VAN) mode is one of the optical modes that can achieve a very high contrast and many liquid crystal display manufacturers are beginning to use this particular optical mode in their displays.

The pretilt angle is defined as the tilt angle of the liquid crystal director at the boundary surface. In VAN mode liquid crystal displays, the pretilt angle is small, so the orientation of the molecules of the liquid crystal fluid are nearly perpendicular to the substrate surfaces when there is no electric field applied across the display. Therefore, incoming linearly polarized light, perpendicular to the display substrates, sees a small birefringence as it passes through the layer. Hence this normally incident linearly polarized light experiences little phase retardation when going through the liquid crystal fluid, including being reflected back from the bottom reflective substrate of the display. This provides a very dark "OFF" state when using crossed polarizers (e.g., polarizing beam splitter—PBS), thus very high contrast is achieved. Upon application of an electric field across the liquid crystal fluid, the molecules in the bulk of the liquid crystal fluid orient themselves toward a direction defined by alignment layers on the substrate surfaces, thereby increasing the retardation of the layer of the liquid crystal fluid. Therefore, linearly polarized incident light starts to experience a phase retardation when going into the liquid crystal fluid and then being reflected back from the bottom reflective substrate of the display. As a result of this, the polarization state of the out-going light (reflected light) will be elliptical and some light starts to pass through the crossed polarizers. Increasing the electric field increases this effect until the brightest state is achieved.

In a typical VAN mode, the orientations of the molecules of the liquid crystal fluid at the substrate surfaces are defined by the alignment layers on each of the substrate surfaces. This orientation is described by a pretilt angle and a surface azimuthal direction, which is parallel to the projection of the liquid crystal director onto the plane of the substrate. The azimuthal direction of the molecules of the liquid crystal fluid proximate to the top alignment layer is opposite to the azimuthal direction of the molecules of the liquid crystal fluid proximate to the bottom alignment layer, i.e., anti-parallel. The azimuthal directions defined by the alignment layers are at a 45 degree angle with the direction of polarization of the incoming linearly polarized incident light, as shown in FIGS. 1a and 1b. Usually the pretilt angle of the molecules in a VAN mode display needs to be kept small, e.g., less than 4 degrees, to achieve a very dark "OFF" state, hence the high contrast. Although this pretilt angle is large enough to prevent reverse tilt domains in the display, it is not possible to overcome the defects that occur due to fringe fields between neighboring pixels. Fringe fields become very significant when the pixel size becomes small as is typical in LCOS microdisplays. For example, the size of an LCOS microdisplay may measure one inch diagonally and have a pixel size of approximately 12 $\mu$m×12 $\mu$m. When high resolution is required, e.g., digital cinema applications, pixel size may be further reduced to approximately 9 $\mu$m×9 $\mu$m or even smaller. In such situations fringe fields are quite pronounced and the liquid crystals do not align along the direction defined by the tilt direction of the alignment layers. Ultimately this will create defects at the pixel boundaries, usually known as disclinations. This is quite apparent when one pixel is in an "ON" state and an adjacent pixel is in an "OFF" state, wherein the fringe fields are very strong.

To overcome the above problem, it is necessary to increase the pretilt angle generated by the alignment layers on the substrate surfaces. Experimentally it has been determined that the pretilt angle has to be at least 8 degrees to overcome the fringe field effects. However, the dark state of a VAN mode liquid crystal display with a pretilt angle of this magnitude has a significant amount of light leakage through the crossed polarizers and the light contrast it can achieve is not that high. Therefore, the inherent property of VAN displays, the very dark "OFF" state, cannot be fully achieved. This is due to the non-zero birefringence seen by the linearly polarized incident light due to the high pretilt angle of the liquid crystal fluid. Heretofore, it has been necessary to use other methods such as attaching external retarders to stop this light leakage. Generally, this is the current method used by all the VAN liquid crystal display manufactures to solve the above problem.

SUMMARY OF THE INVENTION

The present invention overcomes the above-identified problems as well as other shortcomings and deficiencies of existing technologies by providing a system, method and apparatus having pretilt angles sufficient to overcome disclinations due to fringe fields, and, at the same time, achieving high contrast.

In the typical VAN optical mode, the surface azimuthal direction is 45 degrees to the direction of polarization of incoming linearly polarized incident light. Therefore, there is an effective birefringence as seen by the incoming incident light and it increases with increasing pretilt angle, hence the amount of light leakage.

If the display shown in FIG. 1a is rotated by 45 degrees with respect to the polarization direction of the incident linearly polarized light, i.e., the surface azimuthal direction of the molecules of the liquid crystal fluid is either parallel or perpendicular to the direction of polarization of incoming incident linearly polarized light, then the light leakage is minimum because the effective birefringence as seen by the incoming incident linearly polarized light is zero and does not depend on the pretilt of the molecules of the liquid crystal fluid. However, this configuration cannot be applied to practical applications because the "ON" state is not bright due to the same reason explained above. But this feature is advantageously being used in the present invention, i.e., surface azimuthal directions generated by the top and bottom substrates are set substantially perpendicular to each other. Also at the same time, the surface azimuthal direction generated by one substrate is perpendicular/parallel to the direction of polarization of incoming linearly polarized light while the surface azimuthal direction from the other substrate is parallel/perpendicular. Essentially this is a 90 degree twisted structure in the "OFF" state. Because the majority of the molecules of the liquid crystal layer do not have their azimuthal directions oriented at 45 degrees to the direction of polarization of incoming incident linearly polarized light, the effective birefringence as seen by the incoming incident linearly polarized light is minimal as compared to a VAN structure where all molecules have the same tilt angle and their surface azimuthal directions are all oriented at 45 degrees with respect to the polarization direction of the incoming linearly polarized light. Therefore, in the present invention, the light leakage is very small even though the pretilt angle is large enough to remove the disclinations due to fringe fields.

An important technical feature of the optical mode of the present invention takes place when in the "ON" state. In the "ON" state, the invention behaves differently from a conventional 90 degree twisted nematic (TN) mode, and the invention gives a very good bright state as is desired in liquid crystal display applications using a PBS. In a conventional 90 degree TN mode the linear polarized light is "guided" by the twisted structure, both in going in and coming out of the layer, which would give a dark state with a PBS. According to the present invention, the bright "ON" state is achieved without having to add chiral dopant in the liquid crystal fluid of the display.

Although the surface azimuthal directions of the molecules of the liquid crystal fluid at the bottom and top substrates produce a 90 degree twist, this optical mode does not behave as does a conventional 90 degree twisted nematic mode in the "ON" state. On the other hand, the present invention does not behave as a VAN mode display in the "OFF" state. The present invention produces a much darker state than that of a regular VAN mode display with the same pretilt angle. Therefore, the present invention is neither a VAN nor a conventional 90 degree twisted nematic mode display.

A gray scale, e.g., a light intensity through the polarizer that is intermediate to the "ON" and "OFF" intensities may be obtained by controlling the voltage that is applied across the liquid crystal layer. In a crossed-polarizer (or PBS) configuration, increasing the voltage increases the light passing to the output up to a certain optimum bright-state voltage. The value of this optimum bright state voltage depends upon the liquid crystal material parameters, the cell gap, the pretilt and the light wavelength range of interest. This voltage can be determined experimentally. In addition, perceived gray scale can be controlled by controlling the time that the liquid crystal display is in the "ON" state and the time in the "OFF" state. In addition, color may be generated with methods known in the art such as color filters, use of three displays each for one color in a three-panel system, or with one microdisplay in a field sequential color (FSC) system.

The thickness (d) of the liquid crystal fluid (distance between the inside faces of the top and bottom substrates) may be, for example, about 3.5 µm+/−0.2 µm. The birefringence ($\Delta n$) may be, for example, about 0.0830 at 45° C. Liquid crystal fluids that are being used in the present invention are nematic and have negative dielectric anisotropy $\Delta\in$ ($=\in_\parallel - \in_\perp <0$), where $\in_\parallel$ and $\in_\perp$ are the parallel and perpendicular (to the liquid crystal molecule) components of the dielectric constant of the liquid crystal material. It is contemplated and within the scope of the present invention that any combination of thickness (d) and birefringence ($\Delta n$) may be used so long as the condition: $\Delta n \cdot d > \lambda/4$ is satisfied, where $\lambda$ is wavelength of light incident on the display.

Any liquid crystal fluids developed for VAN displays may be used in the present invention. According to the present invention, it is not necessary to introduce a chiral dopant into the liquid crystal fluid. Typical liquid crystal fluids are for example but not limited to: MLC-6608, MLC-6609 and MLC-6610 manufactured by Merck. A physical property of liquid crystal materials used for VAN displays is negative dielectric anisotropy, i.e., the perpendicular component of the dielectric constant is larger than that of the parallel component. Therefore, with an applied electric field, the molecules of the liquid crystal fluid will arrange themselves perpendicular to the direction of the electric field. For example, the dielectric anisotropy may range from about $\Delta\in = -3.1$ to $-4.2$. Birefringence may range from about 0.0777 to about 0.0996, and the nematic to isotropic phase transition temperature may be above 80° C.

A technical advantage of the present invention is that with this optical mode it is possible to have a much darker "OFF" state, hence high contrast, even with a relatively high pretilt angle compared to the VAN mode display with the same pretilt angle. Because of the high pretilt angle substantially no disclination defects will occur due to the fringe fields across the neighboring pixels at the pixel boundaries. Another technical advantage is that external retarders are not necessary to block the light leakage because of the very good dark state of the present invention.

In projection applications with McNeil type polarizing beam splitters, there is a system retarder, usually a quarter wave plate, for each and every color channel (RGB) to compensate the skew rays. When regular VAN mode displays are accommodated in such applications, then this system retarder can also be used to stop the light leakage. Essentially it is going to be a compromise state between the skew ray compensation and light leakage. However, this does not work well for the BLUE channel giving rise to a reasonable amount of light leakage. Therefore, contrast of the BLUE channel is generally lower than the other two channels (RED and GREEN). In fact the proper retarders to stop the light leakage are the ones with low retardation values of around 50 nanometers or less as shown by experiments. Such retarders with good uniformity are difficult to find and not easily available commercially. According to the present invention, this will not be a problem because of the very dark "OFF" state across the visible spectral region and the system retarders can be used solely to compensate for the skew rays. Also the BLUE channel will not suffer with low contrast either.

Some optical architectures do not require skew ray compensation. An example of this type of architecture are those where a wire-grid polarizing beamsplitter is used to separate input and output beam paths. Such wire-grid beamsplitters are manufactured by Moxtek Inc., of Orem, Utah. Therefore, for such applications the present invention is advantageous since the extra cost of attaching external retarders can be eliminated.

The present invention is directed to a reflective liquid crystal display, comprising: a first substrate that is substantially transparent; a second substrate that is substantially reflective and substantially parallel with said first substrate; and a liquid crystal fluid having a birefringence ($\Delta n$) and a negative dielectric anisotropy, wherein said liquid crystal fluid is between said first and second substrates; said first substrate having a first liquid crystal alignment layer proximate to said liquid crystal fluid, wherein molecules of said liquid crystal fluid that are proximate to the first liquid crystal alignment layer have a first pretilt angle from about 2 degrees to about 15 degrees and a first azimuthal direction; said second substrate having a second liquid crystal alignment layer proximate to said liquid crystal fluid, wherein molecules of said liquid crystal fluid that are proximate to the second liquid crystal alignment layer have a second pretilt angle from about 2 degrees to about 15 degrees and a second azimuthal direction, the second azimuthal direction being substantially perpendicular to the first azimuthal direction.

The polarization direction of the linearly polarized incident light may be approximately parallel with the first surface azimuthal direction. The polarization direction of the linearly polarized incident light may be approximately perpendicular with the first surface azimuthal direction.

Shades of gray may be produced by varying the electric field between said first and second substrates from substantially no electric field to an electric field having an optimum value.

The present invention is also directed to a reflective liquid crystal display, comprising: a first substrate that is substantially transparent; a second substrate that is substantially reflective and substantially parallel with said first substrate; and a liquid crystal fluid having a birefringence ($\Delta n$) and a negative dielectric anisotropy, wherein said liquid crystal fluid is between said first and second substrates; said first substrate having a first liquid crystal alignment layer proximate to said liquid crystal fluid, wherein molecules of said liquid crystal fluid that are proximate to the first liquid crystal alignment layer have a first pretilt angle from about 2 degrees to about 15 degrees and a first azimuthal direction; said second substrate having a second liquid crystal alignment layer proximate to said liquid crystal fluid, wherein molecules of said liquid crystal fluid that are proximate to the second liquid crystal alignment have a second pretilt angle from about 2 degrees to about 15 degrees and a second azimuthal direction, the second azimuthal direction being substantially perpendicular to the first azimuthal direction; wherein: when an electric field is applied between said first and second substrates, a substantial number of the molecules of said liquid crystal fluid increase their tilt angles, and when substantially no electric field is applied between said first and second substrates, a substantial number of the molecules of said liquid crystal fluid have their azimuthal direction substantially perpendicular to said first and second substrates; whereby when the electric field is applied between said first and second substrates, said liquid crystal fluid changes linear polarized incident light at said first substrate to approximately circularly polarized incident light when at said second substrate, wherein said second substrate reflects back the approximately circularly polarized incident light as approximately circularly polarized light of opposite handedness, wherein said liquid crystal fluid changes the approximately circularly polarized reflected light to approximately linear polarized reflected light when at said first substrate such that the polarization directions of the linearly polarized incident light and the linearly polarized reflected light at said first substrate are approximately perpendicular, and whereby when substantially no electric field is applied between said first and second substrates, said liquid crystal fluid does not substantially change the polarization of light passing through the liquid crystal fluid and the polarization directions of the linearly polarized incident light and the linearly polarized reflected light at said first substrate are approximately parallel.

The electric field may be applied between said first and second substrates for a plurality of first times and substantially no electric field may be applied for a plurality of second times, wherein the first and second times may be varied to produce shades of gray. The first and second times may also be varied to produce field sequential colors.

The present invention is directed to a method for a reflective liquid crystal display, said method comprising the steps of providing a first substrate that is substantially transparent; providing a second substrate that is substantially reflective and substantially parallel with said first substrate; and providing a liquid crystal fluid having a birefringence ($\Delta n$) and a negative dielectric anisotropy between said first and second substrates; providing a first liquid crystal alignment layer on said first substrate, said first liquid crystal alignment layer being proximate to said liquid crystal fluid, wherein molecules of said liquid crystal fluid that are proximate to the first liquid crystal alignment layer have a first pretilt angle from about 2 degrees to about 15 degrees and a first azimuthal direction; providing a second liquid crystal alignment layer on said second substrate, said second liquid crystal alignment layer being proximate to said liquid crystal fluid, wherein molecules of said liquid crystal fluid that are proximate to the second liquid crystal alignment layer have a second pretilt angle from about 2 degrees to about 15 degrees and a second azimuthal direction, the second azimuthal direction being substantially perpendicular to the first tilt orientation direction; such that when substantially no electric field is applied between said first and second substrates, said liquid crystal fluid does not change the polarization state of light passing therethrough and the polarization directions of the linearly polarized incident light and the linearly polarized reflected light at said first substrate are substantially parallel, when applying an electric field of an optimum value between said first and second substrates, said liquid crystal fluid changes linear polarized incident light at said first substrate to approximately circularly polarized incident light when at said second substrate, wherein said second substrate reflects back the approximately circularly polarized incident light as approximately circularly polarized light of opposite handedness, wherein said liquid crystal fluid changes the approximately circularly polarized reflected light to approximately linear polarized reflected light when at said first substrate such that the polarization directions of the linearly polarized incident light and the linearly polarized reflected light at said first substrate are approximately perpendicular, and when applying an electric field less than the optimum value between said first and second substrates, said liquid crystal fluid changes the polarization state of the incident linearly polarized light to elliptically polarized light upon passing through said liquid crystal fluid and being reflected back from said second substrate.

Varying the electric field between said first and second substrates may be used to produce shades of gray by causing the polarization state of the incident light at said second substrate to vary from approximately linear polarization to elliptical polarization, and when there is substantially no electric field the polarization of the incident light at said second substrate is approximately linear.

The present invention is also directed to a method for a reflective liquid crystal display, said method comprising the steps of: providing a first substrate that is substantially transparent; providing a second substrate that is substantially reflective and substantially parallel with said first substrate; and providing a liquid crystal fluid having a birefringence (Δn) and a negative dielectric anisotropy, wherein said liquid crystal fluid is between said first and second substrates; providing a first liquid crystal alignment layer on said first substrate, said first liquid crystal alignment layer being proximate to said liquid crystal fluid, wherein molecules of said liquid crystal fluid that are proximate to the first liquid crystal alignment layer have a first pretilt angle from about 2 degrees to about 15 degrees and a first azimuthal direction; providing a second liquid crystal alignment layer on said second substrate, said second liquid crystal alignment layer being proximate to said liquid crystal fluid, wherein molecules of said liquid crystal fluid that are proximate to the second liquid crystal alignment layer have a second pretilt angle from about 2 degrees to about 15 degrees and a second azimuthal direction, the second azimuthal direction being substantially perpendicular to the first azimuthal direction; wherein: when substantially no electric field is applied between said first and second substrates, a substantial number of the molecules of said liquid crystal fluid have their orientation substantially perpendicular to said first and second substrates; and when applying an electric field between said first and second substrates, a substantial number of the molecules of said liquid crystal fluid change tilt towards parallel to the substrates; whereby when applying the electric field between said first and second substrates, said liquid crystal fluid changes linear polarized incident light at said first substrate to approximately circularly polarized incident light when at said second substrate, wherein said second substrate reflects back the approximately circularly polarized incident light as approximately circularly polarized light of opposite handedness, wherein said liquid crystal fluid changes the approximately circularly polarized reflected light to approximately linear polarized reflected light when at said first substrate such that the polarization directions of the linearly polarized incident light and the linearly polarized reflected light at said first substrate are approximately perpendicular, and whereby when no electric field is applied between said first and second substrates, said liquid crystal fluid does not substantially change the polarization state of light passing through said liquid crystal fluid such that the polarization directions of the linearly polarized incident light and the linearly polarized reflected light at said first substrate are approximately parallel.

The present invention is also directed to a reflective liquid crystal display assembly comprising: a first substantially transparent substrate; a second substantially reflective substrate located substantially parallel to said first substrate; a liquid crystal fluid having a birefringence (Δn) and a negative dielectric anisotropy, wherein said liquid crystal fluid is between said first and second substrates; first and second liquid crystal alignment layers on said first and second substrates, respectively, wherein molecules of said fluid proximate the first and second liquid crystal alignment layers have finite pretilt angles and are oriented in first and second azimuthal directions, respectively; wherein the assembly is configured such that (i) when substantially no electric field is applied between the substrates, a substantial number of fluid molecules are oriented substantially perpendicular to said substrates, (ii) when an electrical field of optimum value is applied between the substrates, tilt angles of a substantial number of fluid molecules increase, and (iii) when a less than optimum electric field is applied between said substrates, a substantial number of fluid molecules are oriented at intermediate tilt angles.

Other technical advantages of the present disclosure will be readily apparent to one skilled in the art from the following figures, descriptions, and claims. Various embodiments of the invention obtain only a subset of the advantages set forth. No one advantage is critical to the invention.

BRIEF DESCRIPTION OF THE DRAWINGS

A more complete understanding of the present disclosure and advantages thereof may be acquired by referring to the following description taken in conjunction with the accompanying drawings, wherein.

Figure 1A:
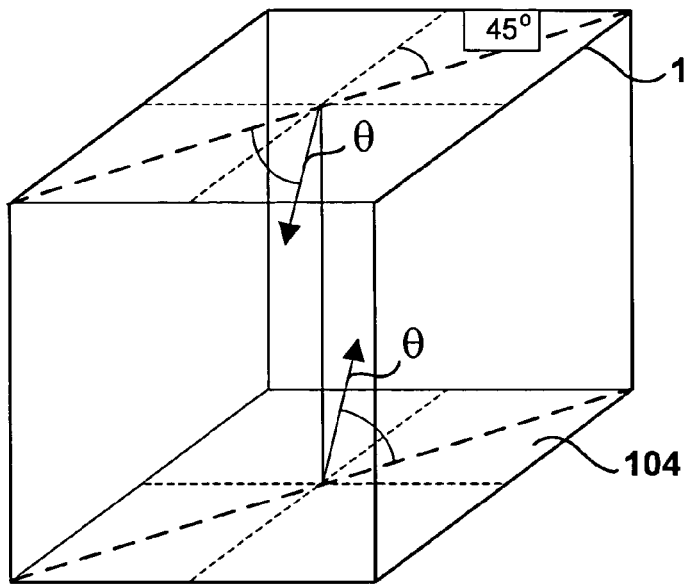
FIGS. 1a and 1b are schematic representations of a prior art VAN mode liquid crystal display in the "OFF" and "ON" states, respectively.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

The present invention is directed to a reflective liquid crystal microdisplay comprising a matrix of pixels of a liquid crystal fluid having light modifying properties controlled by voltage values stored in capacitors comprising the areas representing the pixels in the matrix of pixels of the liquid crystal microdisplay. The molecules of the liquid crystal fluid have a surface azimuthal direction that is either approximately parallel or perpendicular to the direction of polarization of incoming incident linearly polarized light.

According to the present invention, when in the "OFF" state (no electric field across the pixel capacitors), the molecules of the liquid crystal fluid have pretilt angles (measured from the perpendicular directions of the faces of the substrates) just sufficient to minimize disclinations due to fringe fields. The azimuthal direction of the molecules of the liquid crystal fluid at the transparent substrate is at approximately 90 degrees from the azimuthal direction of the molecules of the liquid crystal fluid at the reflective substrate. This configuration results in a very dark state when in the "OFF" state, resulting in high contrast.

Figure 4:
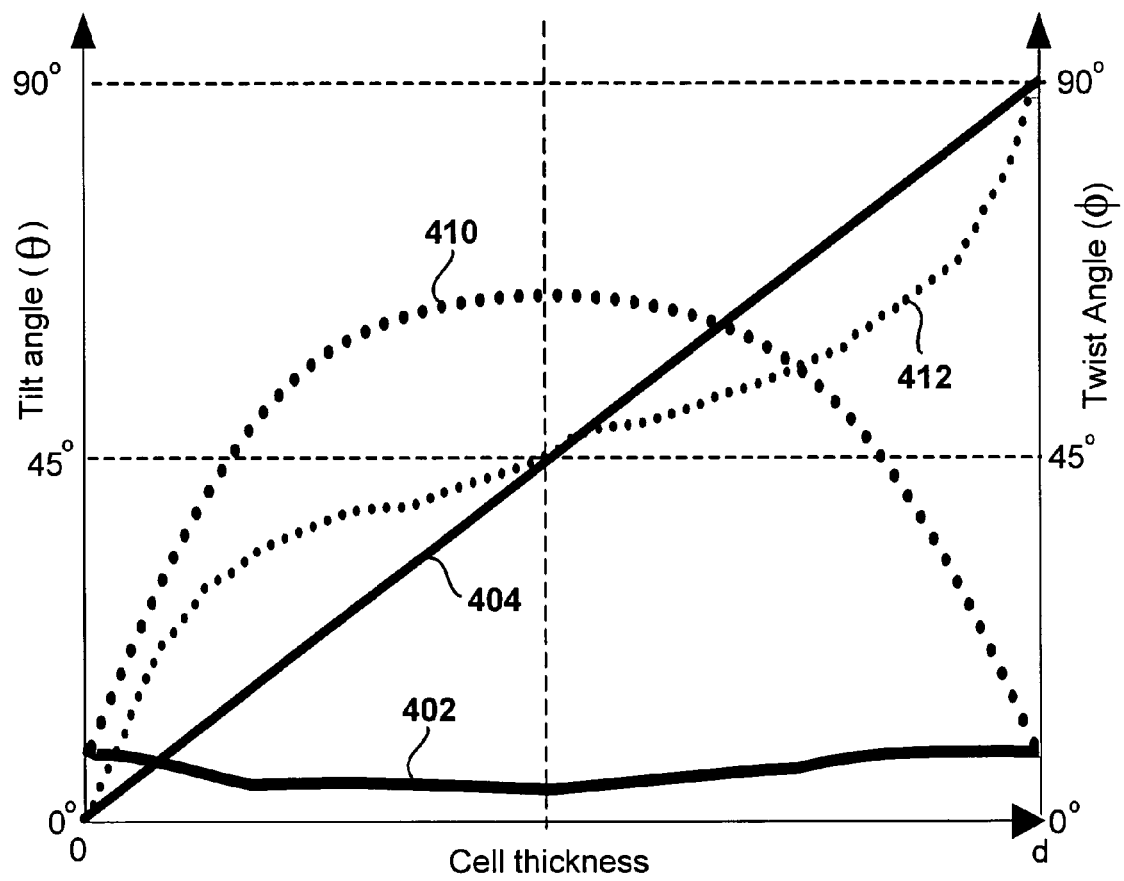
FIG. 4 is a collection of graphical representations of the tilt angles and azimuthal angles of liquid crystal fluid molecules as a function of the molecules' locations between the substrates in "OFF," and "ON" states, according to the present invention.

Application of a voltage to the liquid crystal layer changes the tilt of the liquid crystal molecules in the bulk of the layer in a direction towards parallel to the substrates, due to the negative dielectric anisotropy of the material (see FIG. 4).

Referring now to the drawings, the details of exemplary embodiments of the invention are schematically illustrated. Like elements in the drawings will be represented by like numbers, and similar elements will be represented by like numbers with a different lower case letter suffix.

Figure 1B:
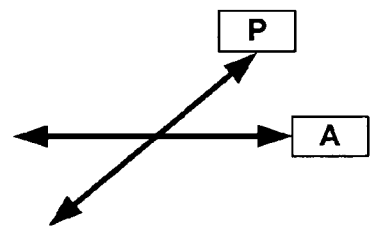
Figure 1B:
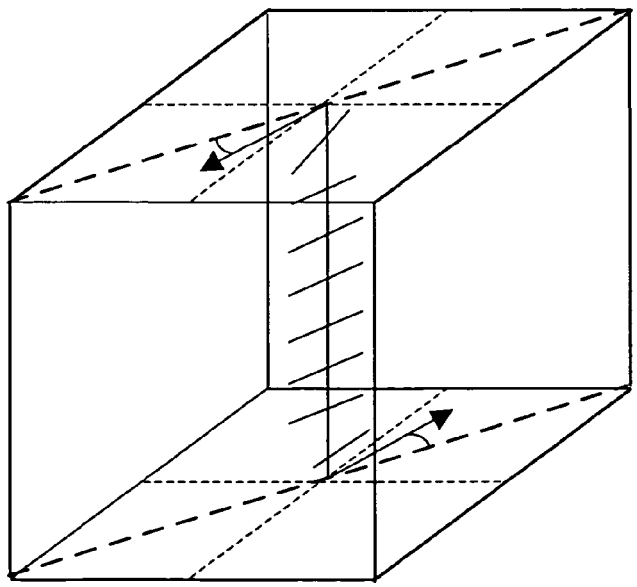

Referring to FIGS. 1a and 1b, depicted are schematic representations of a prior art VAN mode liquid crystal display in the "OFF" and "ON" states, respectively. The azimuthal direction of the liquid crystal molecules defined by the alignment layers on the substrate surfaces 102, 104, are antiparallel to each other, and are at a 45 degree angle with the direction of polarization of incoming incident linearly polarized light. In a VAN mode liquid crystal display, the pretilt angle θ needs to be kept small, e.g., less than 4 degrees, to achieve a very dark "OFF" state, hence high contrast.

Figure 2:
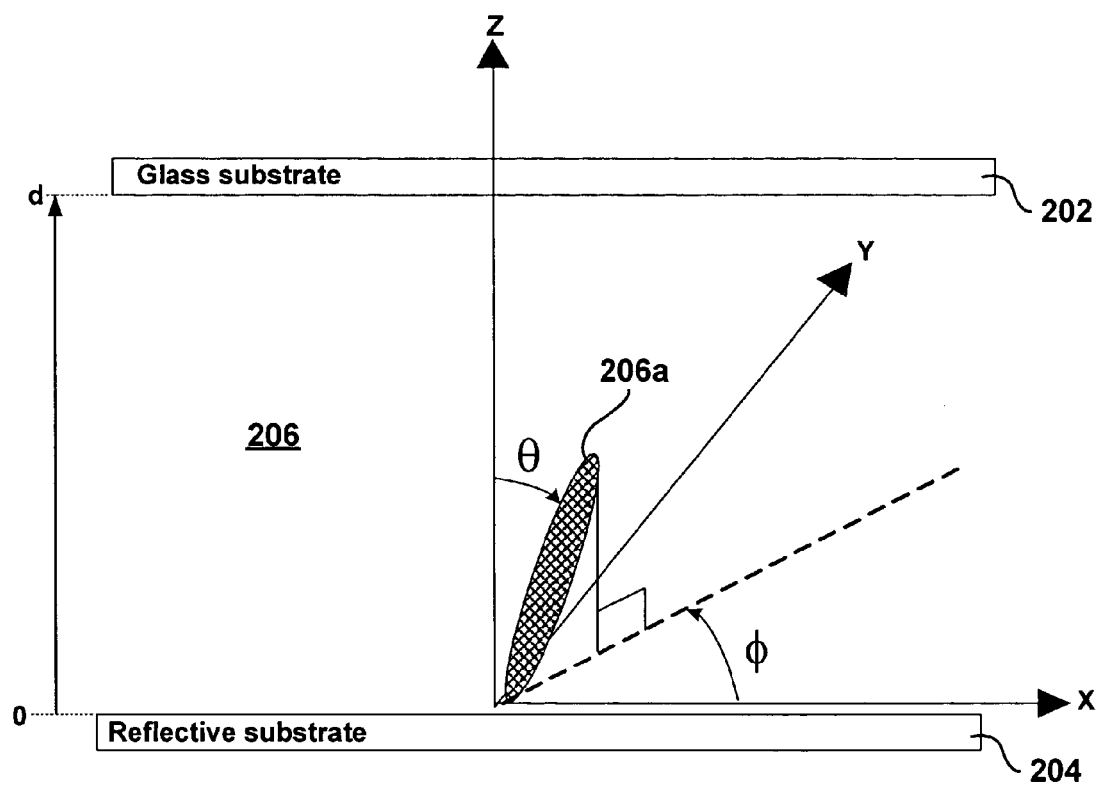
FIG. 2 is a schematic elevational view of a portion of the liquid crystal display showing the azimuthal direction and pretilt angles of an exemplary molecule in a liquid crystal fluid.

Referring now to FIG. 2, depicted is a schematic elevational view of a portion of a liquid crystal display showing the azimuthal direction angle (Φ) and tilt angle (θ) of an exemplary molecule in a liquid crystal fluid. A glass (transparent) substrate 202 and a reflective (mirror) substrate 204 are parallel and have liquid crystal fluid, generally represented by the numeral 206, therebetween. The distance (thickness of liquid crystal fluid) between these parallel substrates is generally represented by "d." The distance (thickness), d, preferably may be about 3.5 μm+/−0.2 μm. The liquid crystal fluid 206 preferably may have a birefringence (Δn) of about 0.0830 at 45° C. Liquid crystal fluids that are being used in the present invention are nematic and have negative dielectric anisotropy $\Delta\epsilon$ ($=\epsilon_{\parallel}-\epsilon_{\perp}<0$), where $\epsilon_{\parallel}$ and $\epsilon_{\perp}$ are the parallel and perpendicular (to the nematic director) components of the dielectric constant of the liquid crystal fluid. It is contemplated and within the scope of the present invention that any combination of distance (thickness) (d) and birefringence (Δn) may be used with the condition: $\Delta n \cdot d > \lambda/4$ is approximately satisfied for an efficient bright state at a convenient voltage, (where λ is the wavelength of light incident on the display). For example, with a cell gap of approximately 3.5 μm, using MLC-6608, and a pretilt of approximately 8 degrees from surface-normal, the optimum bright state voltage is approximately 4.0V for Red (640 nm), 3.5V for Green (540 nm) and 3.15V for Blue (470 nm).

A single molecule 206a of the liquid crystal fluid 206 is shown for exemplary purposes. The tilt angle θ is measured from the Z-axis which is perpendicular to the substrates 202 and 204. The azimuthal angle Φ is measured from the X-axis in the XY plane and is the angle between the X axis and the projection of the molecules of the liquid crystal fluid 206 on the XY plane. According to the present invention, polarization direction of the linearly polarized incident light at the glass substrate will be either approximately parallel or perpendicular to the azimuthal direction generated at the glass substrate 202.

Figure 3A:
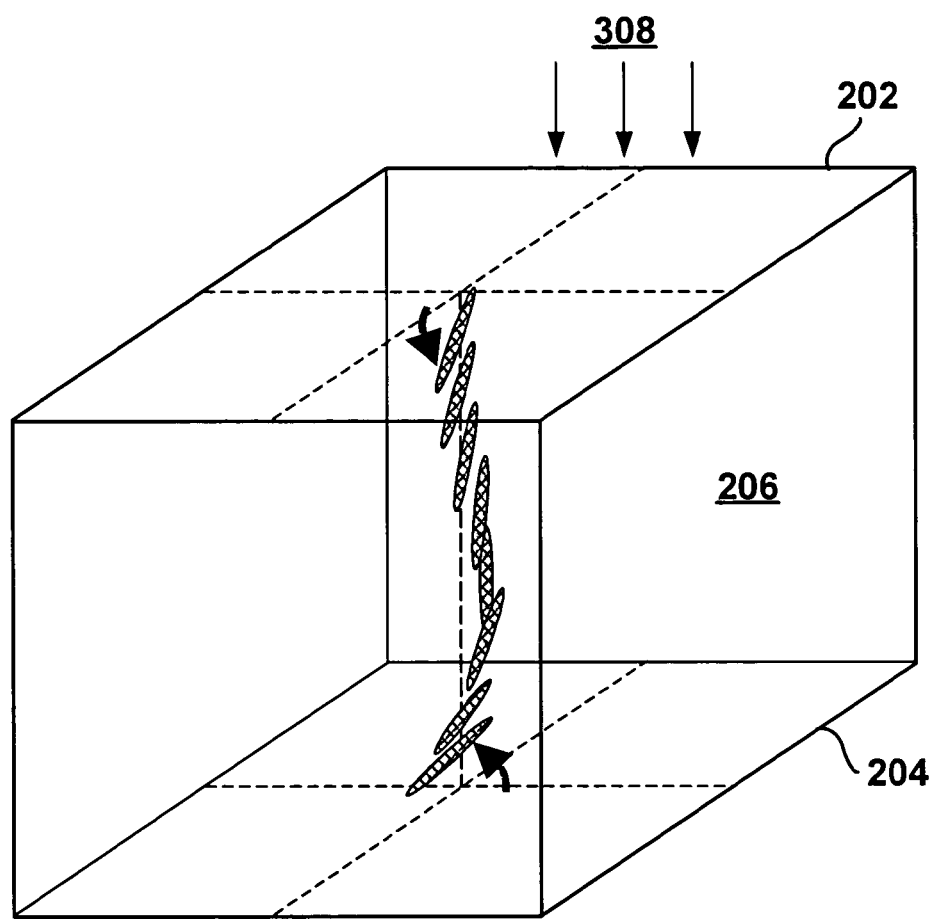
FIGS. 3a and 3b are schematic representations of a liquid crystal display in the "OFF" and "ON" states, respectively, according to the present invention.

Referring to FIG. 3a, depicted is a schematic representation of a liquid crystal display in the "OFF" state, according to the present invention. The molecules of the liquid crystal fluid 206 are depicted in the "OFF" state wherein the pretilt angle θ (defined above) is only large enough to remove disclinations due to fringe fields. Preferably the pretilt angle θ may be from about 2 degrees to about 15 degrees. Most preferably the pretilt angle θ may be from about 5 degrees to about 15 degrees. The polarization state of the incident light 308 will not be affected substantially by the molecules of the liquid crystal fluid 206 and will be reflected back from the substrate 204 as substantially linearly polarized light with the polarization direction substantially parallel with that of the incident linearly polarized light.

Figure 3B:
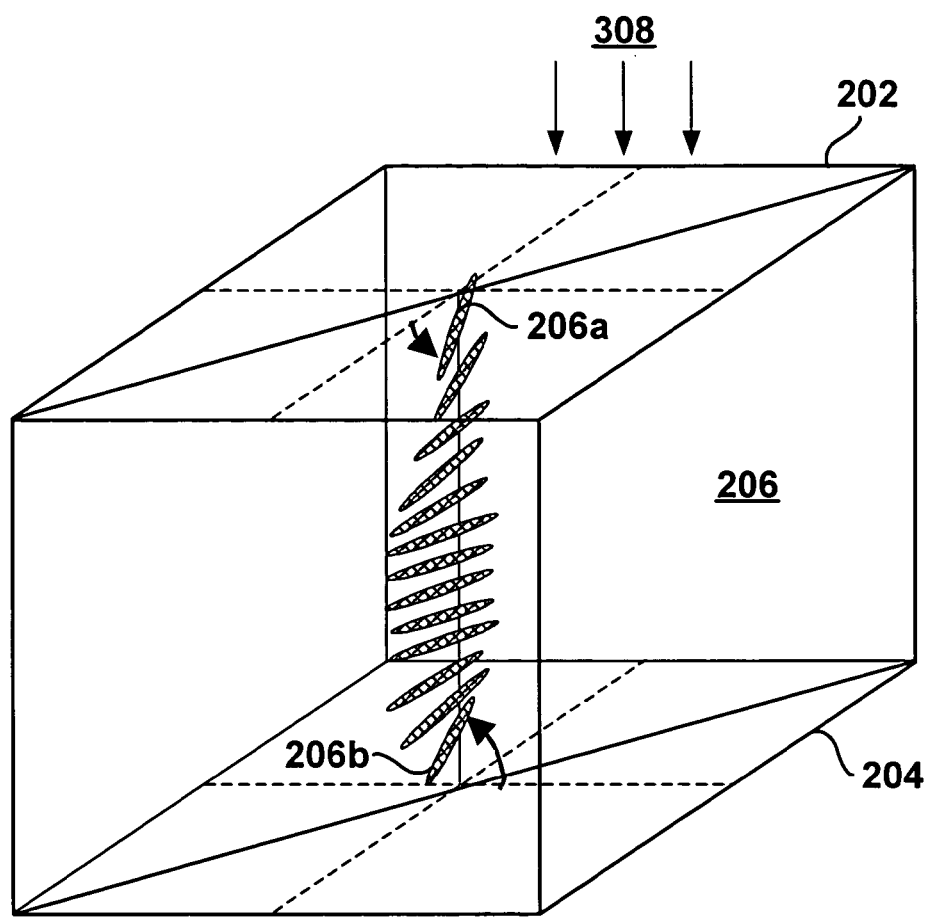

Referring to FIG. 3b, depicted is a schematic representation of a liquid crystal display in the "ON" state, according to the present invention. The configuration of the liquid crystal fluid 206, formed under optimum voltage drive, will cause the linearly polarized incident light entering the substrate 202 to become approximately circularly polarized light at the substrate 204. The approximately circularly polarized incident light at the substrate 204 will be reflected back as approximately circularly polarized light, but with opposite handedness, and when it reaches the substrate 202, this reflected light will be approximately linearly polarized with a polarization direction approximately perpendicular to that of the linearly polarized incident light.

Referring now to FIG. 4, depicted are graphical representations of the tilt angles and azimuthal angles of molecules of the liquid crystal fluid 206 as a function of the location of these molecules located between the substrates in "OFF" and "ON" states, according to the present invention. Tilt angle θ is depicted on the left vertical axis from 0 to 90 degrees, and the azimuthal angle Φ is depicted on the right vertical axis from 0 to 90 degrees. The locations of the molecules of the liquid crystal fluid 206 between the substrates 202 and 204 are depicted on the horizontal axis from 0 to d. Curve 402 depicts the tilt angle θ of the molecules of the liquid crystal fluid 206 when they are in the "OFF" state. Curve 404 depicts the azimuthal angle Φ of the molecules of the liquid crystal fluid 206 when they in the "OFF" state. Curve 410 depicts the tilt angle θ of the molecules of the liquid crystal fluid 206 when they are in the "ON" state. Curve 412 depicts the azimuthal angle Φ of the molecules of the liquid crystal fluid 206 when they are in the "ON" state. Corresponding tilt curves for an intermediate gray shade would fall between curves 402 and 410 and azimuthal curves would fall between curves 404 and 412.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those having ordinarily skills in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for a reflective liquid crystal display, said method comprising the steps of:
providing a first substrate that is substantially transparent;
providing a second substrate that is substantially reflective and substantially parallel with said first substrate; and
providing a liquid crystal fluid having a birefringence ($\Delta n$) and a negative dielectric anisotropy between said first and second substrates;
providing a first liquid crystal alignment layer on said first substrate, said first liquid crystal alignment layer being proximate to said liquid crystal fluid, wherein molecules of said liquid crystal fluid that are proximate to the first liquid crystal alignment layer have a first pretilt angle from about 2 degrees to about 15 degrees and a first azimuthal direction;
providing a second liquid crystal alignment layer on said second substrate, said second liquid crystal alignment layer being proximate to said liquid crystal fluid, wherein molecules of said liquid crystal fluid that are proximate to the second liquid crystal alignment layer have a second pretilt angle from about 2 degrees to about 15 degrees and a second azimuthal direction, the second azimuthal direction being substantially perpendicular to the first azimuthal direction; such that
when substantially no electric field is applied between said first and second substrates, said liquid crystal fluid does not change the polarization state of light passing therethrough and the polarization directions of the linearly polarized incident light and the linearly polarized reflected light at said first substrate are substantially parallel,
when applying an electric field of an optimum value between said first and second substrates, said liquid crystal fluid changes linear polarized incident light at said first substrate to approximately circularly polarized incident light when at said second substrate, wherein said second substrate reflects back the approximately circularly polarized incident light as approximately circularly polarized light of opposite handedness, wherein said liquid crystal fluid changes the approximately circularly polarized reflected light to approximately linear polarized reflected light when at said first substrate such that the polarization directions of the linearly polarized incident light and the linearly polarized reflected light at said first substrate are approximately perpendicular, and
when applying an electric field less than the optimum value between said first and second substrates, said liquid crystal fluid changes the polarization state of the incident linearly polarized light to elliptically polarized light upon passing through said liquid crystal fluid and being reflected back from said second substrate.

2. The method of claim 1, wherein the polarization direction of the linearly polarized incident light is approximately parallel with the first azimuthal direction.

3. The method of claim 1, wherein the polarization direction of the linearly polarized incident light is approximately perpendicular with the first azimuthal direction.

4. The method of claim 1, further comprising the step of varying the electric field between said first and second substrates so as to produce shades of gray by causing the polarization state of the incident light at said second substrate to vary from approximately linear polarization to elliptical polarization, and when there is substantially no electric field the polarization of the incident light at said second substrate is approximately linear.

5. The method of claim 1, wherein a distance (d) between inside faces of said first and second substrates is about 3.5 micrometers.

6. The method of claim 1, wherein a distance (d) between inside faces of said first and second substrates is from about 3.3 micrometers to about 3.7 micrometers.

7. The method of claim 1, wherein said liquid crystal fluid has a birefringence ($\Delta n$) of about 0.0830 at about 45 degrees Celsius.

8. The method of claim 1, wherein said liquid crystal fluid has a birefringence ($\Delta n$) from about 0.0777 to about 0.0996.

9. The method of claim 1, wherein the birefringence $\Delta n$ times d is greater than $\lambda/4$ when an electric field having an optimum value is applied between said first and second substrates, where d is the distance between inside faces of said first and second substrates and $\lambda$ is the wavelength of light.

10. The method of claim 1, wherein the molecules of said liquid crystal fluid have a tilt angle ($\theta$) of from about 5 degrees to about 15 degrees when substantially no electric field is applied between said first and second substrates.

11. The method of claim 1, wherein the molecules of said liquid crystal fluid have a tilt angle ($\theta$) of from about 2 degrees to about 15 degrees when substantially no electric field is applied between said first and second substrates.

12. The method of claim 1, wherein an azimuthal angle ($\Phi$) of the molecules of said liquid crystal fluid varies from about 0 degrees at said first substrate to about 90 degrees at said second substrate when substantially no electric field is applied between said first and second substrates.

13. The method of claim 1, wherein an azimuthal angle ($\Phi$) of the molecules of said liquid crystal fluid varies from about 0 degrees at said second substrate to about 90 degrees at said first substrate when substantially no electric field is applied between said first and second substrates.

14. A method for a reflective liquid crystal display, said method comprising the steps of:
providing a first substrate that is substantially transparent;
providing a second substrate that is substantially reflective and substantially parallel with said first substrate; and
providing a liquid crystal fluid having a birefringence ($\Delta n$) and a negative dielectric anisotropy, wherein said liquid crystal fluid is between said first and second substrates;
providing a first liquid crystal alignment layer on said first substrate, said first liquid crystal alignment layer being proximate to said liquid crystal fluid, wherein molecules of said liquid crystal fluid that are proximate to the first liquid crystal alignment layer have a first pretilt angle from about 2 degrees to about 15 degrees and a first azimuthal direction;
providing a second liquid crystal alignment layer on said second substrate, said second liquid crystal alignment layer being proximate to said liquid crystal fluid, wherein molecules of said liquid crystal fluid that are proximate to the second liquid crystal alignment layer have a second pretilt angle from about 2 degrees to about 15 degrees and a second azimuthal direction, the second azimuthal direction being substantially perpendicular to the first azimuthal direction;

wherein:

when applying substantially no electric field between said first and second substrates, a substantial number of the molecules of said liquid crystal fluid are substantially perpendicular to said first and second substrates; and when applying an electric field between said first and second substrates, a substantial number of the molecules of said liquid crystal fluid increase their tilt angles;

whereby when applying the electric field between said first and second substrates, said liquid crystal fluid changes linear polarized incident light at said first substrate to approximately circularly polarized incident light when at said second substrate, wherein said second substrate reflects back the approximately circularly polarized incident light as approximately circularly polarized light of opposite handedness, wherein said liquid crystal fluid changes the approximately circularly polarized reflected light to approximately linear polarized reflected light when at said first substrate such that the polarization directions of the linearly polarized incident light and the linearly polarized reflected light at said first substrate are approximately perpendicular, and whereby when applying substantially no electric field between said first and second substrates, said liquid crystal fluid does not substantially change the polarization state of light passing through said liquid crystal fluid such that the polarization directions of the linearly polarized incident light and the linearly polarized reflected light at said first substrate are approximately parallel.

15. A method to overcome defects that occur due to fringe fields between neighboring pixels in a reflective liquid crystal display when the pixel size or pixel pitch becomes small, said method comprising the steps of:

providing a first substrate that is substantially transparent;

providing a second substrate that is substantially reflective and substantially parallel with said first substrate;

providing a chiral dopant free liquid crystal fluid having a birefringence ($\Delta n$) and a negative dielectric anisotropy between first and second substrates;

providing a first liquid crystal alignment layer on said first substrate, said first liquid crystal alignment layer being proximate to said liquid crystal fluid, wherein molecules of said liquid crystal fluid that are proximate to the first liquid crystal alignment layer have a first pretilt angle from about 2 degrees to about 15 degrees and a first azimuthal direction; and providing a second liquid crystal alignment layer on said second substrate, said second liquid crystal alignment layer being proximate to said liquid crystal fluid, wherein molecules of said liquid crystal fluid that are proximate to the second liquid crystal alignment layer have a second pretilt angle from about 2 degrees to about 15 degrees and a second azimuthal direction, the second azimuthal direction being substantially perpendicular to the first azimuthal direction.

16. The method of claim 15, wherein the polarization direction of the linearly polarized incident light is approximately parallel with the first azimuthal direction.

17. The method of claim 15, wherein the polarization direction of the linearly polarized incident light is approximately perpendicular with the first azimuthal direction.

18. The method of claim 15, wherein the birefringence $\Delta n$ times d is greater than $\lambda/4$ when an electric field having an optimum value is applied between said first and second substrates, where d is the distance between inside faces of said first and second substrates and $\lambda$ is the wavelength of light.

19. The method of claim 15, wherein an azimuthal angle ($\Phi$) of the molecules of said liquid crystal fluid varies from about 0 degrees at said second substrate to about 90 degrees at said first substrate when substantially no electric field is applied between said first and second substrates.

20. The method of claim 15, wherein said pixel pitch is between 7 to 20 micrometers.

21. The method of claim 15, wherein said pixel size is less than or equal to 9 µm×9 µm.

* * * * *